US009917671B2

(12) United States Patent
Stracca et al.

(10) Patent No.: US 9,917,671 B2
(45) Date of Patent: Mar. 13, 2018

(54) PASSIVE OPTICAL NETWORKS AND METHOD OF CONFIGURING TRANSMISSION WAVELENGTHS THEREIN

(75) Inventors: Stefano Stracca, Pisa (IT); Luca Giorgi, Ponsacco (IT); Filippo Ponzini, Bedonia (IT)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 62 days.

(21) Appl. No.: 14/399,873

(22) PCT Filed: Jun. 8, 2012

(86) PCT No.: PCT/EP2012/060915

§ 371 (c)(1),
(2), (4) Date: Nov. 7, 2014

(87) PCT Pub. No.: WO2013/170907

PCT Pub. Date: Nov. 21, 2013

(65) Prior Publication Data

US 2015/0131994 A1    May 14, 2015

(30) Foreign Application Priority Data

May 14, 2012  (EP) .................................. 12167818

(51) Int. Cl.
*H04J 14/00*   (2006.01)
*H04B 10/20*   (2006.01)
(Continued)

(52) U.S. Cl.
CPC ............ *H04J 14/023* (2013.01); *H04B 10/27* (2013.01); *H04B 10/572* (2013.01);
(Continued)

(58) Field of Classification Search
USPC .............................................. 398/58, 53, 67
See application file for complete search history.

(56) References Cited

U.S. PATENT DOCUMENTS

2009/0016726 A1 * 1/2009 Suzuki ............... H04B 10/0793
                                                                  398/79
2011/0038627 A1 * 2/2011 Ciaramella ......... H04J 14/0221
                                                                  398/38
(Continued)

FOREIGN PATENT DOCUMENTS

WO    2011/020503 A1    2/2011
WO    WO 2011020503 A1 *    2/2011    .............. H04J 14/00

OTHER PUBLICATIONS

PCT International Search Report, dated Feb. 22, 2013, in connection with International Application No. PCT/EP2012/060915, all pages.

*Primary Examiner* — David Payne
*Assistant Examiner* — Pranesh Barua
(74) *Attorney, Agent, or Firm* — Leffler Intellectual Property Law, PLLC

(57) ABSTRACT

A method of configuring transmission wavelengths in a passive optical network comprising a wavelength selective routing element between first and second locations. The method comprises: at a first location: a. iteratively generating and transmitting a first optical signal at different ones of a plurality of wavelengths until a second optical signal is received at the first location; and then b. ceasing transmission of the first optical signal and then recommencing transmission of the first optical signal at the wavelength being transmitted when the second optical signal was received; and at a second location, remote from the first location: c. waiting until the first optical signal is received at the second location; d. iteratively generating and transmitting the second optical signal at different ones of a plurality of wavelengths until the first optical signal is no longer received at the second location; and e. maintaining genera- (Continued)

tion and transmission of the second optical signal at the wavelength being transmitted when the first optical signal was no longer received.

10 Claims, 10 Drawing Sheets

(51) Int. Cl.
  *H04J 14/02*   (2006.01)
  *H04B 10/27*   (2013.01)
  *H04B 10/572*  (2013.01)
(52) U.S. Cl.
  CPC ........ *H04J 14/025* (2013.01); *H04J 14/0246* (2013.01); *H04J 14/0282* (2013.01)

(56) References Cited

U.S. PATENT DOCUMENTS

| | | | | |
|---|---|---|---|---|
| 2011/0236017 | A1* | 9/2011 | Ohlen | H04J 14/0282 398/34 |
| 2012/0163813 | A1* | 6/2012 | Grosso | H04J 14/0226 398/49 |
| 2012/0224850 | A1* | 9/2012 | Cavaliere | H04J 14/00 398/34 |
| 2013/0028598 | A1* | 1/2013 | Cavaliere | H04B 10/071 398/34 |

* cited by examiner ically a passive optical network comprising a wavelength selective routing element between first and second locations. The invention further relates to a passive optical network and to optical network elements.

PASSIVE OPTICAL NETWORKS AND METHOD OF CONFIGURING TRANSMISSION WAVELENGTHS THEREIN

CROSS-REFERENCE TO RELATED APPLICATIONS

This application claims priority under 35 U.S.C. § 119 to European Patent Application No. 12167818.9, filed May 14, 2012, which is hereby incorporated herein by reference in its entirety.

TECHNICAL FIELD

The invention relates to a method of configuring transmission wavelengths in a passive optical network, particularly a passive optical network comprising a wavelength selective routing element between first and second locations. The invention further relates to a passive optical network and to optical network elements.

BACKGROUND

Wavelength division multiplexed (WDM) passive optical networks (PON) dramatically increase the link capacity compared with other optical fibre access networks. Using dedicated wavelengths for each connection between a subscriber and the central office, the current technology allows up to 40 10 Gigabit Ethernet (GbE) links to operate on the same optical fibre, exploiting only C and L bands, with an increase in bandwidth expected in the near future. The bandwidth combined with the end to end connectivity offered by each wavelength (virtual point to point) can be used for ultra high speed access, and for high value and low cost mobile backhauling.

Several system architectures and transmission techniques have been proposed to lower the cost or increase the performance of a WDM PON. A common feature of these architectures and techniques is the use of a "colourless" optical network termination (ONT), that is an ONT which can be configured to operate at any network wavelength at the subscriber side, and can therefore be connected to any port of the remote node. The use of colourless ONTs allows higher production volumes, a low number of spare parts, and makes it easier for network operators to manage an unpredictable network evolution, where different users subscribe or unsubscribe in a random sequence.

There are basically three ways to implement a colourless ONT: sending the optical carrier to be used for uplink transmission to the ONT from a remote location, typically the Central Office (CO); reusing part of the downlink optical signal to as the uplink optical carrier; and locally generating the uplink optical carrier using a tunable laser located in the ONT.

WDM PONs not based on tunable lasers at the ONTs are cheaper, as general rule, but offer poor performance due to link attenuation (the optical carrier goes from the CO to the ONT before being transmitted back again) and cross-talk between upstream and downstream signals, caused by reflections between uplink and downlink.

Using tunable lasers to generate the upstream carrier signal at the ONT solves both of these issues because different wavelengths are allocated for the downstream channels and the upstream channels. Although tunable lasers are quite expensive today, the technology is evolving so that they appear to be the most promising solution in the medium to long term. The need to keep an inventory of ONTs supporting all possible wavelengths could be avoided through dedicated protocols or operations and maintenance (O&M) procedures, but in this case one of the main benefits of WDM-PON connectivity, its protocol transparency, is lost.

A method of configuring a transmission wavelength of an optical transmitter in an optical network using physical layer signaling is described in WO2011/020503.

SUMMARY

It is an object to provide an improved method of configuring transmission wavelengths in a passive optical network, particularly a passive optical network comprising a wavelength selective routing element between first and second locations. It is a further object to provide an improved passive optical network. It is a further object to provide improved optical network elements.

A first aspect of the invention provides a method of configuring transmission wavelengths in a passive optical network, the passive optical network comprising a wavelength selective routing element between first and second locations. The method comprises, at a first location, step a. of iteratively generating and transmitting a first optical signal at different ones of a plurality of wavelengths until a second optical signal is received at the first location. The method then comprises, at the first location, step b. of ceasing transmission of the first optical signal for a first time period and then recommencing transmission of the first optical signal at the said wavelength being transmitted when the second optical signal was received. The method further comprises, at a second location, remote from the first location, step c. of waiting until the first optical signal is received at the second location. The method then comprises, at the second location, step d. of iteratively generating and transmitting the second optical signal at different ones of a plurality, N, of wavelengths until the first optical signal is no longer received at the second location. The method then comprises, at the second location, step e. of maintaining generation and transmission of the second optical signal at the said wavelength being transmitted when the first optical signal was no longer received.

The method may enable respective transmission wavelengths to be configured at two locations within a PON using only layer 1 (physical layer) signaling and without requiring any handshake between the first and second locations. The method may therefore be completely transparent with reference to upper layer protocols, which may enable the method to support the use of different protocols, standards and bit rates within the same PON. For example, common public radio interface (CPRI), gigabit Ethernet (GbE), synchronous transport module 16 (STM-16) and 10GbE could all be supported in the same PON.

The method may be used to control power consumption within a PON since the second optical signal is only generated and transmitted at the second location following receipt of the first optical signal.

The method may support deployment of a non-hierarchical PON in which all of the optical network elements comprise the same hardware. The method may be implemented both during configuration of a PON and following the loss of a link within a PON, due for example to reconfiguration of the wavelength selective routing element causing one or both of the first and second optical signals to no longer be received.

In an embodiment, in step a. the first optical signal is transmitted at each said wavelength for a first time period, T1. In step d. the second optical signal is transmitted at each said wavelength for a second time period, T2. T1 is greater than N×T2.

This may ensure that the second optical signal can be tried at each of the plurality of wavelengths before the next wavelength is tried for the first optical signal, which may ensure that the wavelength of the first optical signal is not tuned away from its correct operating wavelength.

In an embodiment, in step a the first optical signal is iteratively generated and transmitted until a first alarm signal having a first alarm state is received at the first location, indicating that the second optical signal is received. Step c. comprises waiting until a second alarm signal having a first alarm state is received at the second location, indicating that the first optical signal is received. In step d. the second optical signal is iteratively generated and transmitted until the second alarm signal having a second alarm state is received at the second location, indicating that the first optical signal is no longer received.

The method may enable respective transmission wavelengths to be configured at two locations within a PON using only simple two-state signaling within the physical layer.

In an embodiment, each of the first and second alarm signals is a loss of signal alarm signal. The first alarm state is a loss of signal alarm OFF state and the second alarm state is a loss of signal alarm ON state.

Loss of signal alarms are widely provided at optical receiver apparatus in optical network elements. Utilising loss of signal alarms may therefore enable the method to be implemented without requiring the provision of dedicated additional hardware. In an embodiment, the passive optical network is a wavelength division multiplexed passive optical network.

In an embodiment, a first plurality of wavelengths are used at the first location and a second plurality of wavelengths, different to the first plurality, are used at the second location. The method may therefore be used to configure a PON to operate at different wavelength bands, for example C-band and L-band, for downstream and upstream transmission.

In an embodiment, the wavelength selective routing element is an arrayed waveguide grating. In an embodiment, the arrayed waveguide grating is a cyclic arrayed waveguide grating.

In an embodiment, the passive optical network is a tree network. In an embodiment, the passive optical network is a ring network.

A second aspect of the invention provides a passive optical network comprising a first optical network provided at a first location, a second optical network element provided at a second location, remote from the first location, and a remote node provided at a third location, between the first and second locations. The first optical network element comprises a first optical transmitter, a first controller and first optical receiver apparatus. The first optical transmitter is arranged to generate and transmit a first optical signal. The first optical receiver apparatus is arranged to receive a second optical signal. The first controller is arranged to control the first optical transmitter to iteratively generate and transmit the first optical signal at different ones of a plurality of wavelengths until the second optical signal is received. The first controller is arranged to then control the first optical transmitter to cease transmission of the first optical signal for a first time period and then recommence transmission of the first optical at the said wavelength being transmitted when the second optical signal was received. The second optical network element comprises a second optical transmitter, a second controller and second optical receiver apparatus. The second optical transmitter is arranged to generate and transmit the second optical signal. The second optical receiver apparatus is arranged to receive the first optical signal. The second controller is arranged to wait until the first optical signal is received.

The second controller is arranged to then control the second optical transmitter to iteratively generate and transmit the second optical signal at different ones of a plurality, N, of wavelengths until the first optical signal is no longer received. The second controller is further arranged to then control the second optical transmitter to maintain generation and transmission of the second optical signal at the said wavelength being transmitted when the first optical signal was no longer received. The remote node comprises a wavelength selective routing element.

The transmission wavelengths of the first and second transmitters may be configured within the PON using only layer 1 (physical layer) signaling and without requiring any handshake between the first and second locations. The PON may therefore have completely transparent signaling with reference to upper layer protocols, which may enable the PON to support the use of different protocols, standards and bit rates. For example, CPRI, GbE, STM16 and 10GbE could all be supported in the same PON.

Providing a wavelength selective routing element at the remote node may ensure that only first optical signals having the correct upstream wavelength are transmitted to the second location and only second optical signals having the correct downstream wavelength are transmitted to the first location.

Power consumption within the PON may be controlled since the second optical transmitter is only operated following receipt of the first optical signal. The PON may be constructed using optical network elements which each comprise the same hardware, with the respective transmission wavelengths being configured following deployment. The PON may therefore be non-hierarchical in nature.

The PON may be able to configure its transmission wavelengths both during network configuration and following the loss of a link within the PON, due for example to reconfiguration of the wavelength selective routing element causing one or both of the first and second optical signals to no longer be received. In an embodiment, the first controller is arranged to control the first optical transmitter to generate and transmit the first optical signal at each said wavelength for a first time period, T1. The second controller is arranged to control the second optical transmitter to generate and transmit the second optical signal at each said wavelength for a second time period, T2. T1 is greater than N×T2. This may ensure that the second optical signal can be tried at each of the plurality of wavelengths before the next wavelength is tried for the first optical signal, which may ensure that the wavelength of the first optical signal is not tuned away from its correct operating wavelength.

In an embodiment, the first optical receiver apparatus comprises a first alarm apparatus arranged to transmit a first alarm signal to the first controller indicative that the second optical signal is received. The second optical receiver apparatus comprises a second alarm apparatus arranged to transmit a second alarm signal to the second controller. The second alarm signal has a first alarm state indicative that the first optical signal is not received and has a second alarm state indicative that the first optical signal is received. Respective transmission wavelengths may therefore be configured at two locations within the PON using only simple two-state signaling within the physical layer.

In an embodiment, each of the first and second alarm apparatus is a loss of signal alarm apparatus. Each alarm signal has a loss of signal alarm ON state indicative that the respective optical signal is not received and a loss of signal alarum OFF state indicative that the respective optical signal is received.

Loss of signal alarms are widely provided at optical receivers in optical network elements. Utilising loss of signal alarm apparatus at the optical receiver apparatus may enable the PON to configure transmission wavelengths without requiring the provision of dedicated additional hardware.

In an embodiment, the first optical network element is an optical network termination and the second optical network element is an optical line termination.

In an embodiment, the first optical network element and the second optical network element have the same construction with the respective controller arranged to operate at the respective location. In an embodiment, the controller of each optical network element is provided with a first set of instructions for arranging the controller to operate at the first location and a second set of instructions for arranging the controller to operate at the first location, and the controller is configured to implement the respective set of instructions for its location. This may reduce the number of different hardware devices required to construct the PON and may support construction of a non-hierarchical PON.

In an embodiment, the passive optical network is a wavelength division multiplexed passive optical network.

In an embodiment, a first plurality of wavelengths are used at the first location and a second plurality of wavelengths, different to the first plurality, are used at the second location. The PON may therefore be configured to operate at different wavelength bands, for example C-band and L-band, for downstream and upstream transmission.

In an embodiment, the wavelength selective routing element is an arrayed waveguide grating. In an embodiment, the arrayed waveguide grating is a cyclic arrayed waveguide grating.

In an embodiment, the passive optical network is a tree network. In an embodiment, the passive optical network is a ring network.

A third aspect of the invention provides a first optical network element comprising an optical transmitter, a controller, and optical receiver apparatus. The optical transmitter is arranged to generate and transmit a first optical signal. The optical receiver apparatus is arranged to receive a second optical signal. The controller is arranged to control the optical transmitter to iteratively generate and transmit the first optical signal at different ones of a plurality of wavelengths until the second optical signal is received. The controller is further arranged to then control the optical transmitter to cease transmission of the first optical signal for a time period and then recommence transmission of the first optical at the said wavelength being transmitted when the second optical signal was received.

The transmission wavelength of the optical transmitter may be configured using only layer 1 (physical layer) signaling and without requiring any handshake between the first optical network element and any other device. The first optical network element may therefore have completely transparent signaling with reference to upper layer protocols, which may enable it to support the use of different protocols, standards and bit rates. For example, CPRI, GbE, STM16 and 10GbE could all be supported.

The transmission wavelength may be configured both during configuration of a PON comprising the first optical network element and following the loss of a link within the PON.

In an embodiment, the optical receiver apparatus comprises alarm apparatus arranged to transmit an alarm signal to the controller indicative that the second optical signal is received. The first optical network element may be configured using only simple physical layer alarm signaling. In an embodiment, the alarm apparatus is a loss of signal alarm apparatus. The alarm signal has a loss of signal alarm ON state indicative that the second optical signal is not received and has a loss of signal alarum OFF state indicative that the second optical signal is received. The first optical network element may be configured using only simple two-state physical layer alarm signaling.

A fourth aspect of the invention provides a second optical network element comprising an optical transmitter, a controller and optical receiver apparatus. The optical transmitter is arranged to generate and transmit a second optical signal. The optical receiver apparatus is arranged to receive a first optical signal. The controller is arranged to wait until the first optical signal is received. The controller is arranged to then control the optical transmitter to iteratively generate and transmit the second optical signal at different ones of a plurality of wavelengths until the first optical signal is no longer received. The controller is further arranged to then control the optical transmitter to maintain generation and transmission of the second optical signal at the said wavelength being transmitted when the first optical signal was no longer received.

The transmission wavelength of the optical transmitter may be configured using only layer 1 (physical layer) signaling and without requiring any handshake between the second optical network element and any other device. The second optical network element may therefore have completely transparent signaling with reference to upper layer protocols, which may enable it to support the use of different protocols, standards and bit rates. For example, CPRI, GbE, STM16 and 10GbE could all be supported.

Power consumption at the second optical network element may be controlled since the optical transmitter is only operated following receipt of the first optical signal.

The transmission wavelength may be configured both during configuration of a PON comprising the second optical network element and following the loss of a link within the PON.

In an embodiment, the optical receiver apparatus comprises alarm apparatus arranged to transmit an alarm signal to the controller. The alarm signal has a first alarm state indicative that the first optical signal is not received and has a second alarm state indicative that the first optical signal is received. The second optical network element may be configured using only simple physical layer alarm signaling.

In an embodiment, the alarm signal has a loss of signal alarm ON state indicative that the first optical signal is not received and has a loss of signal alarm OFF state indicative that the first optical signal is received. The second optical network element may be configured using only simple two-state physical layer alarm signaling.

A fifth aspect of the invention provides a data carrier having computer readable instructions embodied therein. The said computer readable instructions are for providing access to resources available on a processor and the computer readable instructions comprise instructions to cause the processor to perform any of the above steps of the method of configuring transmission wavelengths in a passive optical network.

In an embodiment, the data carrier is a non-transitory data carrier.

Embodiments of the invention will now be described, by way of example only, with reference to the accompanying drawings.

DETAILED DESCRIPTION

Figure 1:
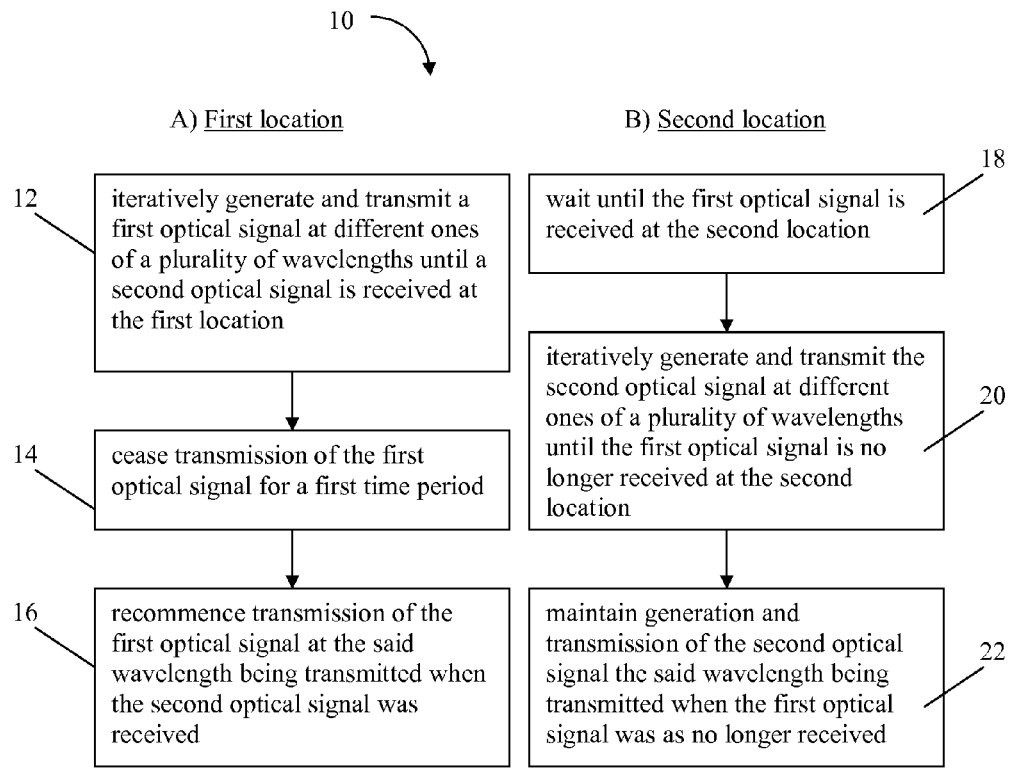
FIG. 1 shows the steps of a method according to a first embodiment of the invention of configuring transmission wavelengths in a passive optical network.

A first embodiment of the invention provides a method 10 of configuring transmission wavelengths at first and second locations in a PON. The PON comprises a wavelength selective routing element between the first and second locations. The steps of the method 10 are shown in FIG. 1.

The method 10 comprises steps carried out at the first location (A) and steps carried out at the second location (B).

At the first location the method comprises step a. followed by step b. Step a. comprises iteratively generating and transmitting a first optical signal at different ones of a plurality of wavelengths until a second optical signal is received at the first location 12. Step b. comprises ceasing transmission of the first optical signal for a first time period 14. Following expiry of the first time period transmission of the first optical signal is recommenced at the wavelength that it was being transmitted at when the second optical signal was received 16.

At the second location, which is remote from the first location, the method comprises step c. followed by step d., followed by step e. Step c. comprises waiting until the first optical signal is received at the second location 18. Step d. comprises iteratively generating and transmitting the second optical signal at different ones of a plurality, N, of wavelengths until the first optical signal is no longer received at the second location 20. Step e. comprises maintaining generation and transmission of the second optical signal at the said wavelength that it was being transmitted at when the first optical signal was no longer received 22.

Figure 2:
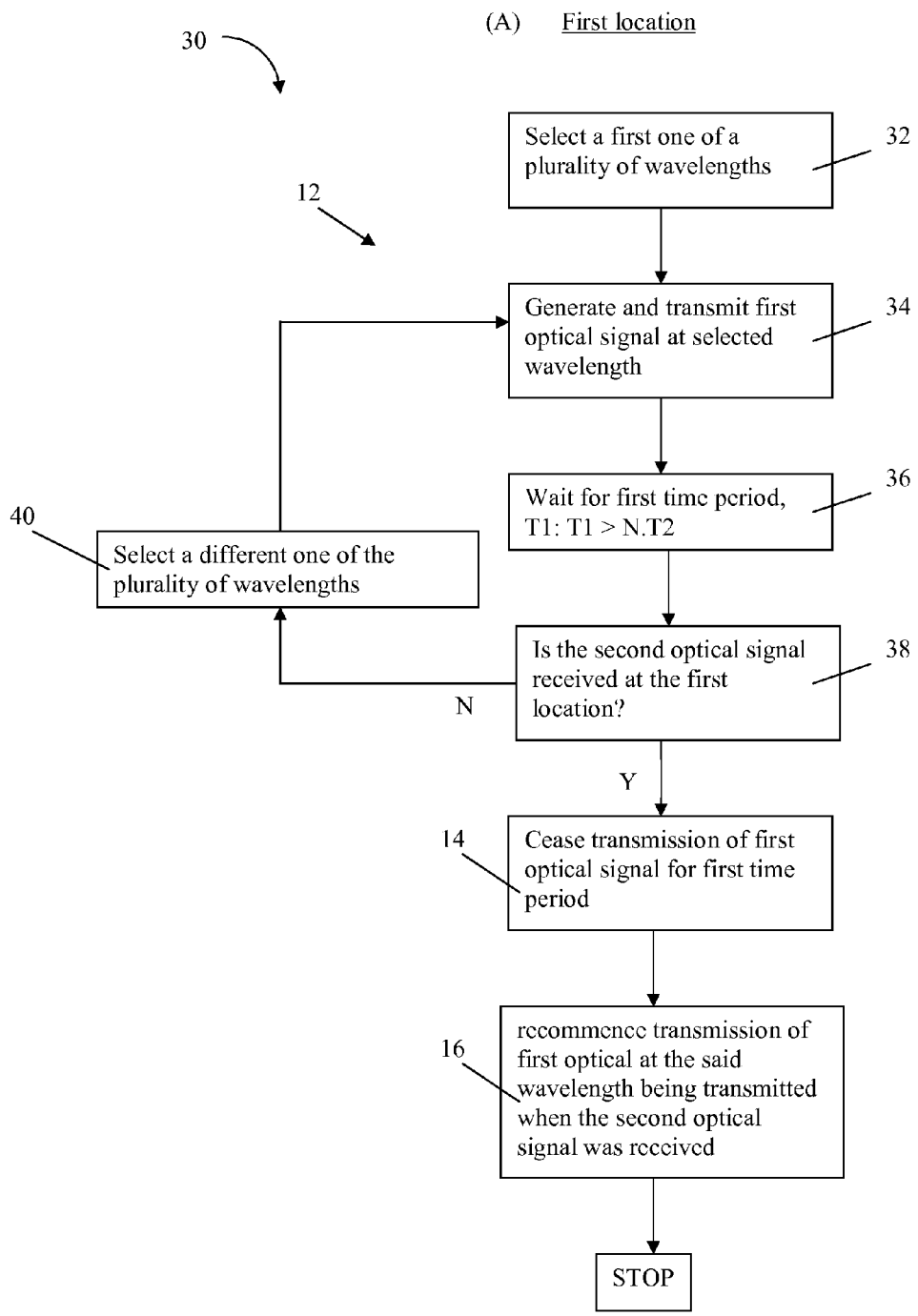
FIG. 2 shows the steps, implemented at a first location, of a method according to a second embodiment of the invention of configuring transmission wavelengths in a passive optical network.
Figure 3:
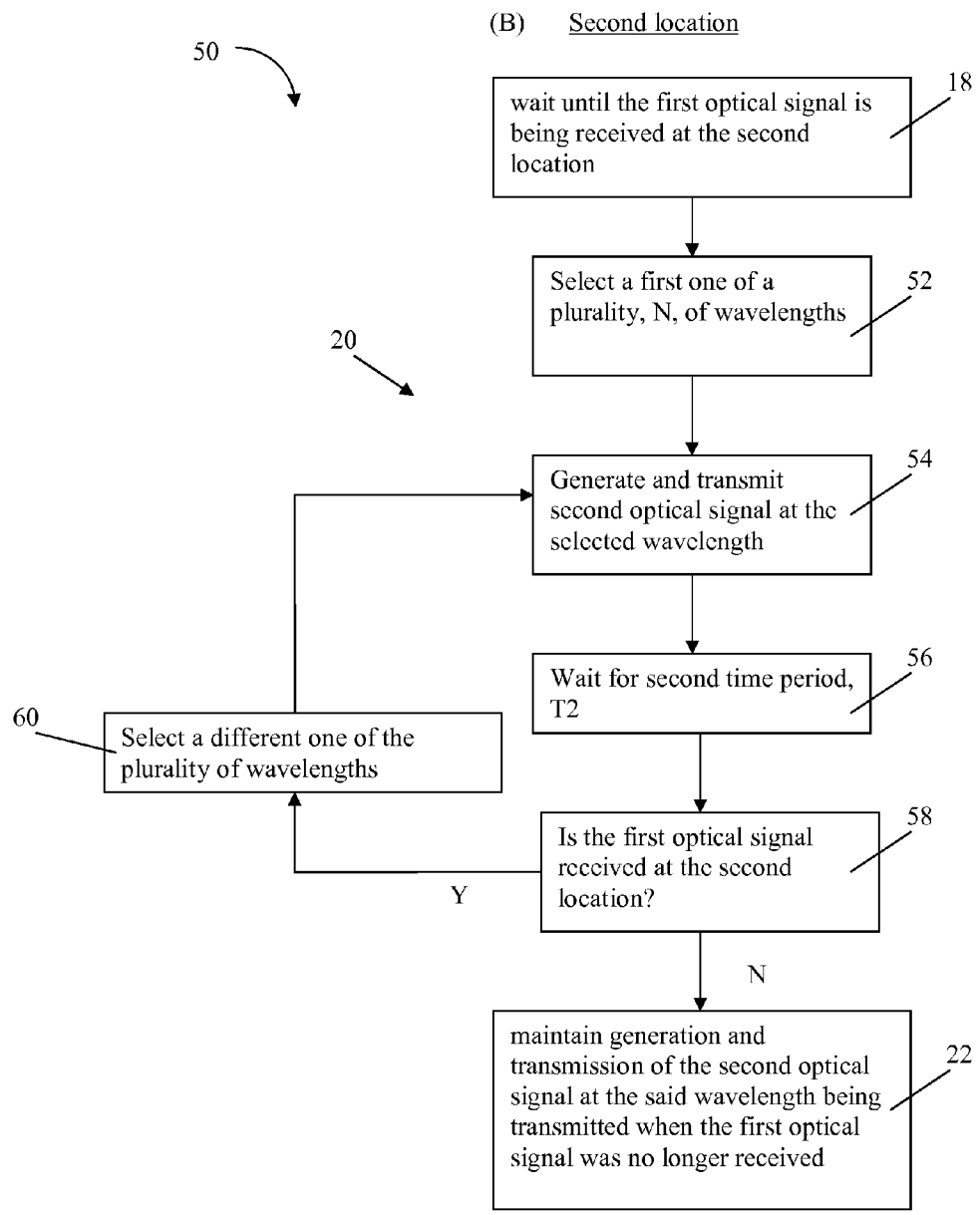
FIG. 3 shows the steps, implemented at a second location, of the method according to the second embodiment of the invention of configuring transmission wavelengths in a passive optical network.

A second embodiment of the invention provides a method 30, 40 of configuring transmission wavelengths at first and second locations in a PON. The steps 30 of the method carried out at the first location (A) are shown in FIG. 2 and the steps 40 of the method carried out at the second location (B) are shown in FIG. 3. The method 30, 40 of this embodiment is similar to the method 10 shown in FIG. 1, with the following modifications. The same reference numbers are retained for corresponding steps.

In this embodiment, step a. comprises selecting a first one of a plurality of wavelengths 32 and generating and transmitting the first optical signal at the selected wavelength 34. The first optical signal is transmitted at the selected wavelength for a first time period, T1, 36. If the second optical signal is received at the first location 38, the method 30 proceeds to step b. If the second optical signal is not received at the first location 38, the method 30 continues in step a. by selecting a different one of the plurality of wavelengths 40 and restarting generation and transmission of the first optical signal at 25 the new selected wavelength 34. Step a. continues to iteratively generate and transmit the first optical signal at different ones of the plurality of wavelengths in this way until the second optical signal is received at the first location.

Step d. comprises selecting a first one of a plurality, N, of wavelengths 52 and generating and transmitting the second optical signal at the selected wavelength 54. The second optical signal is transmitted at the selected wavelength for a second time period, T2 56. If the first optical signal is no longer received at the second location 58, the method 40 proceeds to step e. If the first optical signal is still being received at the second location 58, the method 40 continues in step d. by selecting a different one of the plurality of wavelengths 60 and restarting generation and transmission of the second optical signal at the new selected wavelength 54. Step d. continues to iteratively generate and transmit the second optical signal at different ones of the plurality of wavelengths in this way until the first optical signal is no longer received at the second location.

In order to ensure that the second optical signal can be tried at each of its plurality, N, of wavelengths the first time period, T1, is greater than the total time period required to try the second optical signal at each wavelength. Specifically, T1 is greater than N×T2. In this way the method 30, 40 ensures that the wavelength of the first optical signal is not moved on to a subsequent wavelength until the second optical signal has been tried at all of its potential wavelengths. The provision of a wavelength selective routing element between the first and second locations means that the first optical signal only reaches the second location when it is at the correct wavelength and is therefore passed by the wavelength selective routing element and, similarly, the second optical signal only reaches the first location when it is at its correct wavelength.

Figure 4:
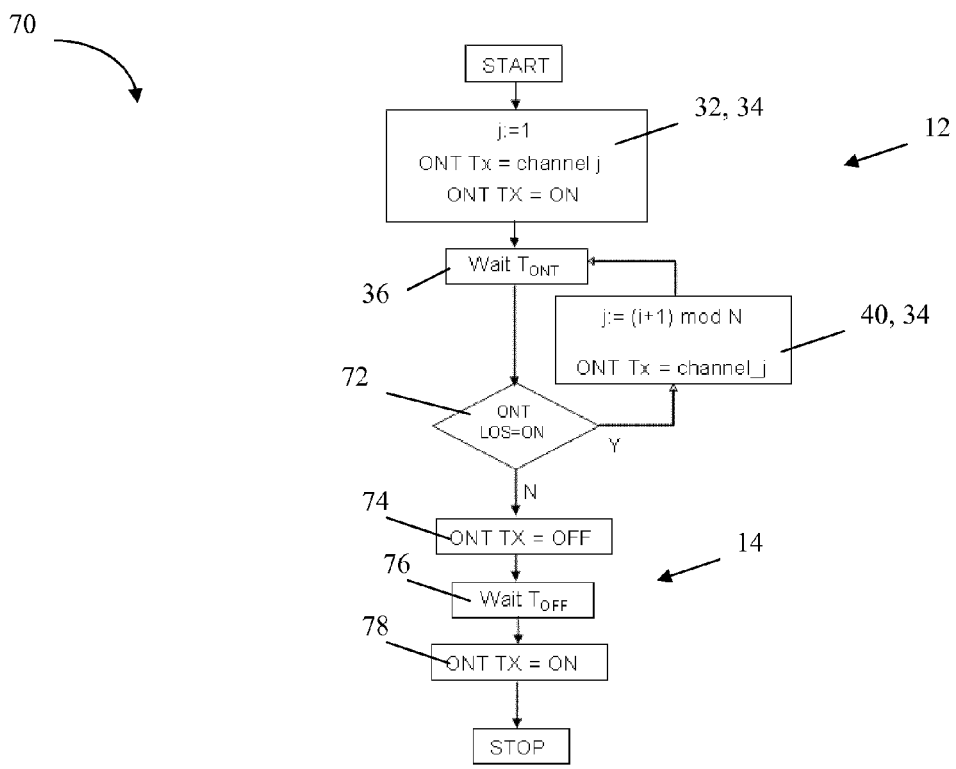
FIG. 4 shows the steps, implemented at a first location, of a method according to a third embodiment of the invention of configuring transmission wavelengths in a passive optical network.
Figure 5:
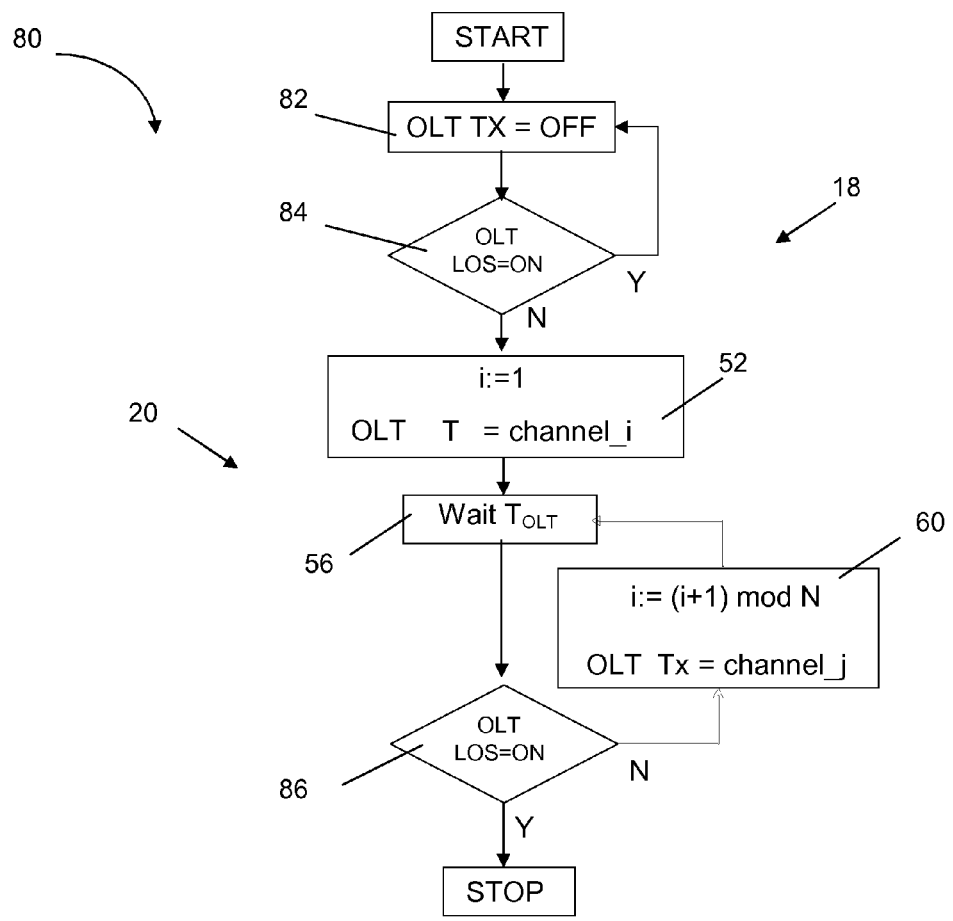
FIG. 5 shows the steps, implemented at a second location, of the method according to the third embodiment of the invention of configuring transmission wavelengths in a passive optical network.

A third embodiment of the invention provides a method 70, 80 of configuring transmission wavelengths at first and second locations in a PON. The steps 70 of the method carried out at the first location (A) are shown in FIG. 4 and the steps 80 of the method carried out at the second location (B) are shown in FIG. 5. The method 70, 80 of this embodiment is similar to the method 30, 40 shown in FIGS. 2 and 3, with the following modifications. The same reference numbers are retained for corresponding steps.

In this embodiment, a first optical network element in the form of an optical network termination (ONT) is provided at the first location and a second optical network element in the form of an optical line termination (OLT) is provided at the second location. In this embodiment, the method at the ONT side 70 starts with the ONT being connected and powered on and the method at the OLT side 80 starts with the OLT transmitter being OFF 82. At the ONT side step a. starts, iteratively generating and transmitting the first optical signal 32, 34, 40 until a first alarm signal having a first alarm state is received at the ONT 72. The first optical signal is transmitted at each selected wavelength for a first time period, $T_{ONT}$, 36.

Receipt of the first alarm signal indicates that the second optical signal is received at the ONT. The first alarm signal is a loss of signal (LOS) alarm signal. If the LOS alarm signal has an ON state 72 (Y) this indicates that the second optical signal is not received at the ONT. If the LOS alarm signal does not have an ON state (N), i.e. it has an OFF state, this indicates that the second optical signal is received at the ONT. The LOS alarm signal starts, when the ONT is powered on, in the ON state.

When the first optical signal is at the correct wavelength, the first optical signal is transmitted by the wavelength selective routing element and is received at the OLT receiver apparatus. As a result, the LOS alarm at the OLT is cleared 84 and the OLT transmitter starts generating and transmitting the second optical signal at a first one (i=1) of the plurality, N, of wavelengths 52. The OLT transmitter iteratively generates and transmits the second optical signal at different ones (i=(i+1) mod N) of the plurality of wavelengths 60, transmitting each wavelength for a second time period, $T_{OLT}$, that is related to the first time period, $T_{ONT}$, by $T_{ONT} > N \times T_{OLT}$.

When the second optical signal is at the correct wavelength, the second optical signal is transmitted by the wavelength selective routing element and is received at the ONT receiver apparatus. This clears the LOS alarm at the ONT and the ONT transmitter is switched OFF 74, to cease transmission of the first optical signal, for a first time period, $T_{OFF}$, 76. The OLT receiver apparatus detects that the first optical signal is no longer 20 received and the LOS alarm at the OLT is turned ON. This signals to the OLT that the wavelength that the second optical signal is currently being transmitted at is the correct one and iteration of the second optical signal wavelength is stopped, with transmission of the second optical signal being maintained at the said wavelength that was being transmitted when the first optical signal stopped being received.

The correct wavelength for transmission at both the OLT and the ONT have then been found and the ONT transmitter is turned back ON 78 to recommence transmission of the first optical signal at the wavelength that it was being transmitted at when the second optical signal was received.

If, due to reconfiguration of the wavelength selective routing element, the optical connection is lost in one or both directions, the respective LOS alarm signal turns to the ON state triggering the method to reconfigure the wavelengths.

Figure 6:
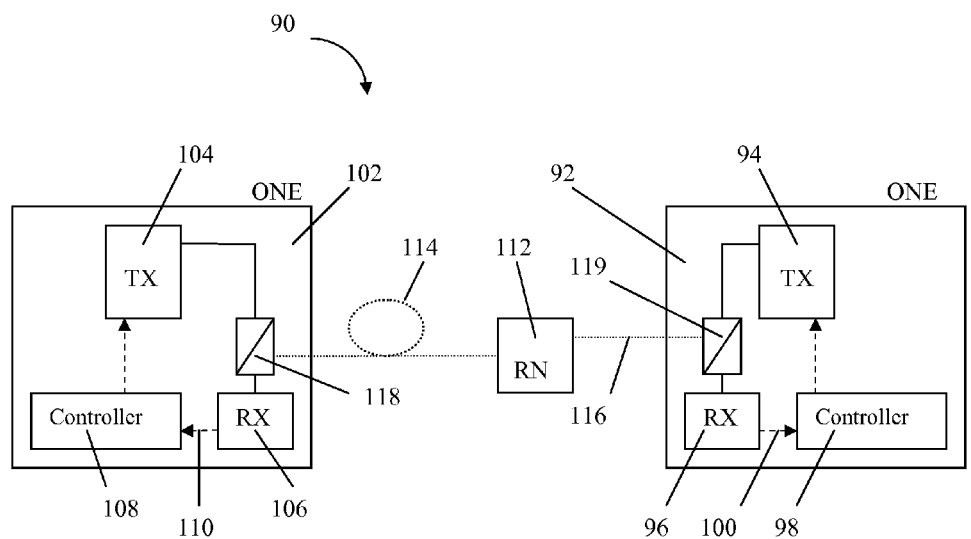
FIG. 6 is a schematic representation of a passive optical network according to a fourth embodiment of the invention.

A passive optical network (PON) 90 according to a fourth embodiment of the invention is shown in FIG. 6. The PON 90 comprises a first optical network element (ONE) 92 provided at a first location, a second ONE 102 provided at a second location, and a remote node (RN) 112 provided at a third location, between the first and second locations. As will be well-known to the person skilled in the art, optical network elements are typically connected to the remote node via a feeder fibre 114 or a distribution fibre 116. These are shown in the figures for clarity only and do not form part of the embodiment.

The first ONE 92 comprises a first optical transmitter 94, a first controller 98 and first optical receiver apparatus 96. The first optical transmitter 94 is arranged to generate and transmit a first optical signal. The first optical receiver apparatus 96 is arranged to receive a second optical signal. The first optical network element 92 additionally comprises a band-split filter 119 arranged to route the first optical signal from the first transmitter 94 into the distribution fibre 116 and arranged to route the second optical signal from the distribution fibre 116 to the receiver apparatus 96.

The first controller 98 is arranged to control the first optical transmitter 94 to iteratively generate and transmit the first optical signal at different ones of a plurality of wavelengths until the second optical signal is received. The first controller is arranged to then control the first optical transmitter to cease transmission of the first optical signal for a first time period. The first controller 98 is further arranged to then control the first optical 20 transmitter to recommence transmission of the first optical signal at the said wavelength which was being transmitted when the second optical signal was received.

The second optical network element 102 comprises a second optical transmitter 104, a second controller 108 and second optical receiver apparatus 106. The second optical transmitter 104 is arranged to generate and transmit the second optical signal. The second optical receiver apparatus 106 is arranged to receive the first optical signal. The second optical network element 102 further comprises a band-split filter 118 arranged to route the first optical signal from the feeder fibre 114 to the second receiver apparatus 106 and to route the second optical signal from the second optical transmitter 104 to the feeder fibre 114.

The second controller 108 is arranged to wait until the first optical signal is received and to then control the second optical transmitter 104 to iteratively generate and transmit the second optical signal at different ones of a plurality, N, of wavelengths until the first optical signal is no longer received. The second controller 108 is further arranged to then control the second optical transmitter to maintain generation and transmission of the second optical signal at the said wavelength which was being transmitted when the first optical signal was no longer received.

The remote node 112 comprises a wavelength-selective routing element which is configured to transmit the first optical signal only when it is at a correct wavelength and is configured to transmit the second optical signal only when the second optical signal is at its correct wavelength.

Figure 7:
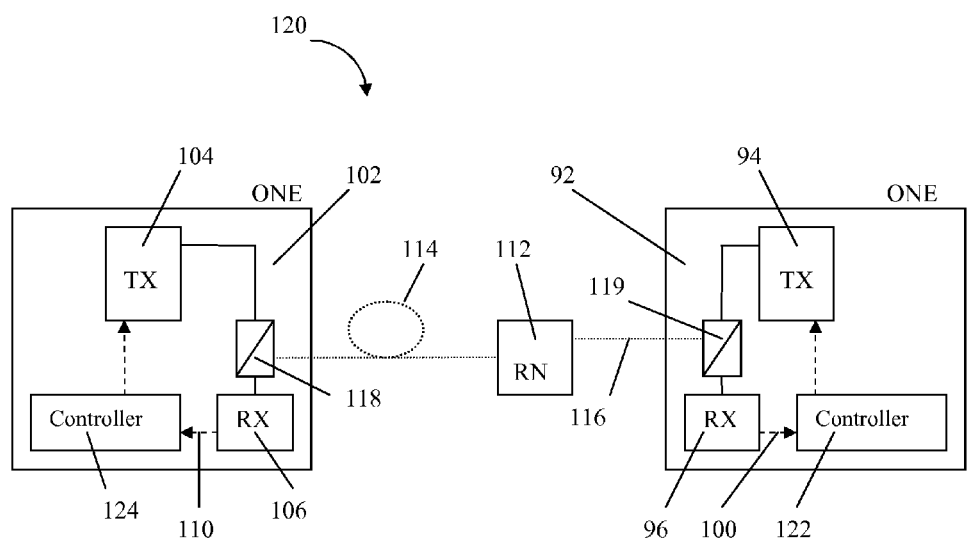
FIG. 7 is a schematic representation of a passive optical network according to a fifth embodiment of the invention.

A PON 120 according to a fifth embodiment of the invention is shown in FIG. 7. The PON of this embodiment is similar to the PON 90 shown in FIG. 6, with the following modifications. The same reference numbers are retained for corresponding features.

Figure 8:
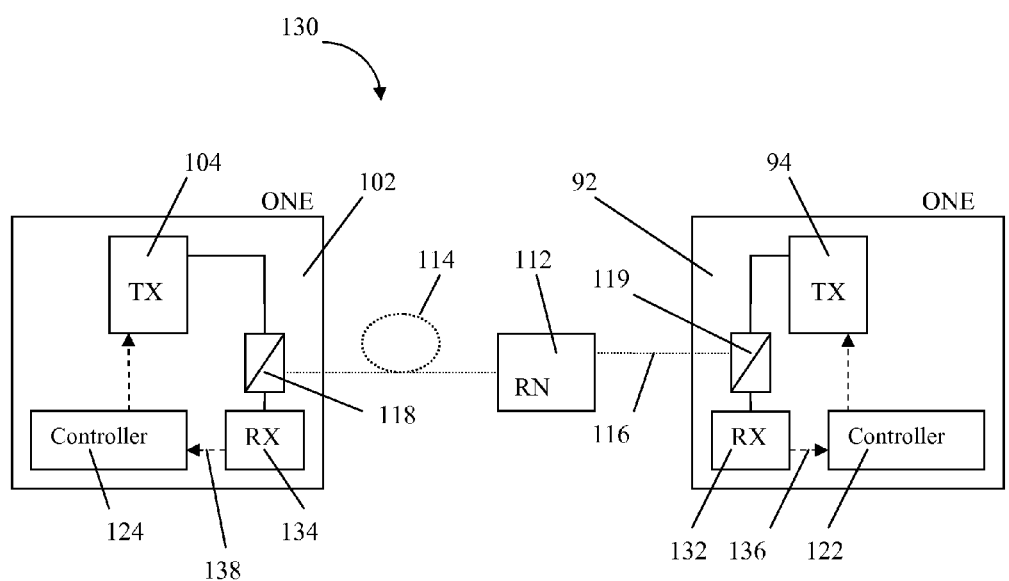
FIG. 8 is a schematic representation of a passive optical network according to a sixth embodiment of the invention.

In this embodiment the first controller 122 is arranged to control the first optical 15 transmitter 94 to generate and transmit the first optical signal at each selected wavelength for a first time period, T1. The second controller 124 is arranged to control the second optical transmitter 104 to generate and transmit the second optical signal at each selected wavelength for a second time period, T2. T1 is greater than N×T2, where N is the plurality of wavelengths from which the second optical signal is selected. A PON 130 according to a sixth embodiment of the invention is shown in FIG. 8.

The PON 130 of this embodiment is similar to the PON 120 of FIG. 7, with the following modifications. The same reference numbers are retained for corresponding features.

In this embodiment, the first optical receiver apparatus 132 comprises a first alarm apparatus. The first alarm apparatus is arranged to transmit a first alarm signal 136 to the first controller 122. The first alarm signal is indicative that the second optical signal is received.

The second optical receiver apparatus 134 comprises a second alarm apparatus arranged to transmit a second alarm signal 138 to the second controller 124. The second alarm signal has a first alarm state indicative that the first optical signal is not received and has a second alarm state indicative that the first optical signal is received.

Figure 9:
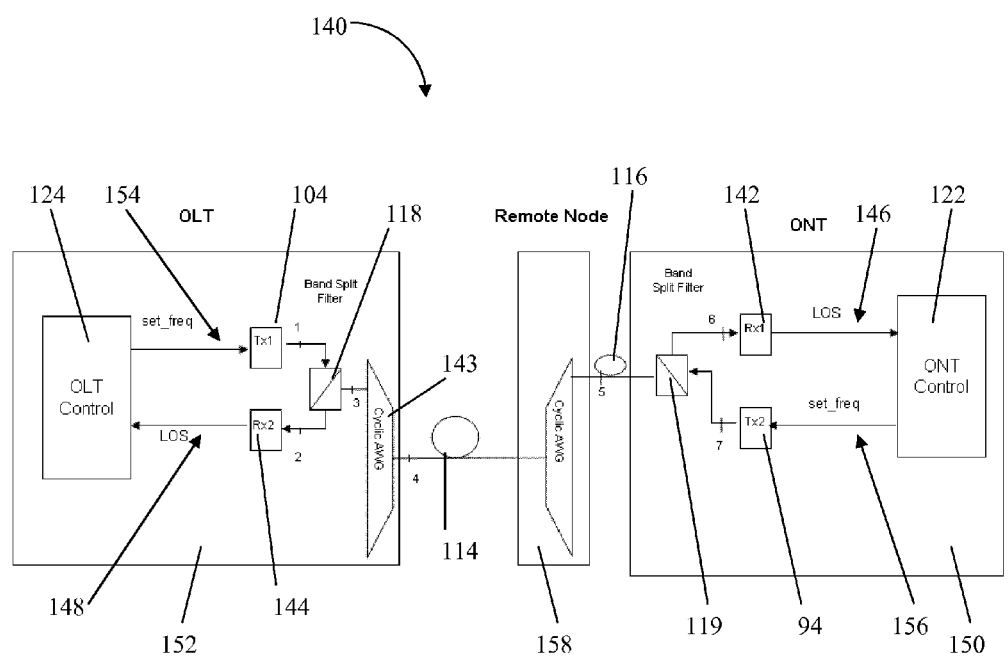
FIG. 9 is a schematic representation of a passive optical network according to a seventh embodiment of the invention.

FIG. 9 shows a PON 140 according to a seventh embodiment of the invention. The PON 140 of this embodiment is similar to the PON 120 of FIG. 7, with the following modifications. The same reference numbers are retained for corresponding features.

In this embodiment, the first optical network element is an optical network termination (ONT) 150 and the second optical network element is an optical line termination (OLT) 152. The remote node 158 comprises a wavelength-selective routing element in the form of a cyclic arrayed waveguide grating (AWG).

The first optical receiver apparatus 142 comprises a first alarm apparatus arranged 10 to transmit a first alarm signal 146 to the first controller 122 indicative that the second optical signal is received. The second optical receiver apparatus 144 comprises a second alarm apparatus arranged to transmit a second alarm signal 148 to the second controller 124. Each of the first and second alarm apparatus 142, 144 is a loss of signal (LOS) alarm apparatus. Each alarm signal 146, 148 has a LOS alarm ON state indicative that the 15 respective optical signal is not received and has a LOS alarm OFF state indicative that the respective optical signal is received.

The first controller 122 is arranged to control the first optical transmitter 94 to generate and transmit the first optical signal at a selected wavelength by transmitting a first "set_freq" signal 156. The second controller 124 is arranged to control the second optical 20 transmitter 104 to generate and transmit the second optical signal by transmitting a second "set_freq" signal 154.

It will be appreciated that although only a single ONT 150 is shown within the PON 140, a larger number of ONTs 150 may be connected to the remote node 158, each being connected to a respective port of the cyclic AWG. It will also be appreciated that the OLT 152 would in that case comprise corresponding number of transmitters and receiver apparatus, each being connected to a respective port of a second cyclic AWG 143.

Figure 10:
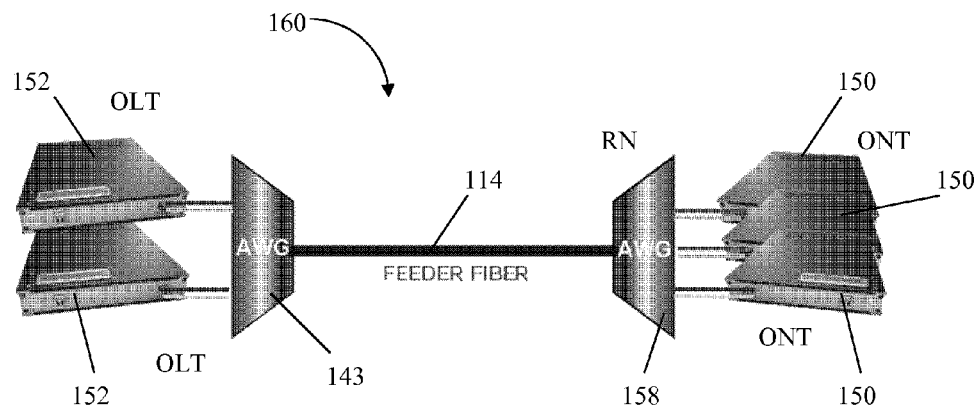
FIG. 10 is a schematic representation of a passive optical network according to an eighth embodiment of the invention.

A PON 160 according to an eighth embodiment of the invention is shown in FIG. 10. The PON 160 is similar to the PON 140 shown in FIG. 9, with the following modifications. The same reference numbers are retained for corresponding features.

The PON 160 has a tree architecture and comprises a plurality of ONTs 150 each at a respective first location, and a plurality of OLTs 152 each at a respective second location.

Figure 11:
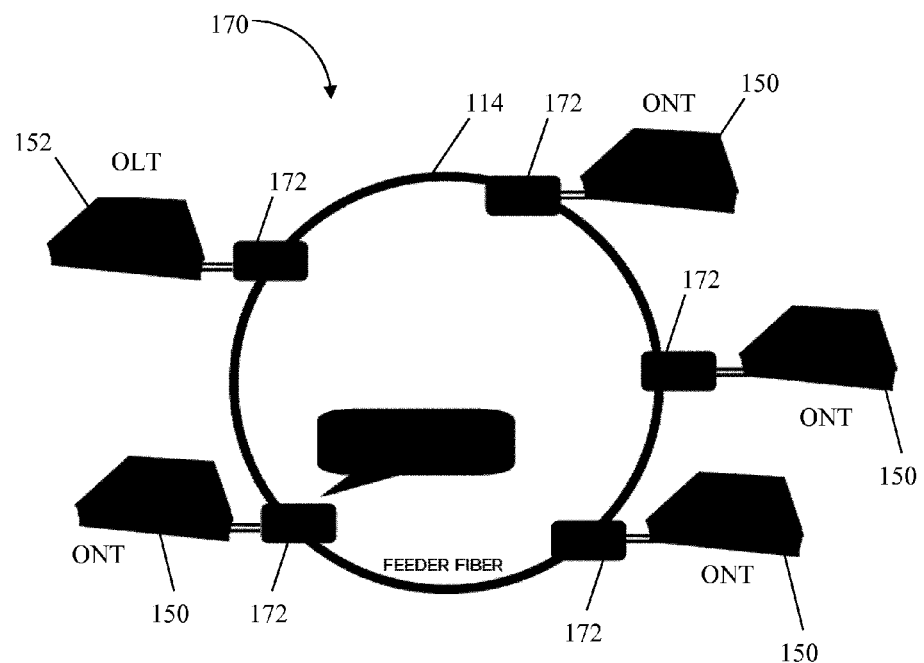
FIG. 11 is a schematic representation of a passive optical network according to a ninth embodiment of the invention.

A PON 170 according to a ninth embodiment of the invention is shown in FIG. 11. The PON 170 of this embodiment is similar to the PON 140 shown in FIG. 9, with the following modifications. The same reference numbers are retained for corresponding features.

The PON 170 of this embodiment has a ring network architecture with each ONT 150 and the OLT 152 being connected to a ring-shaped feeder fibre 114 by a respective node 172. Each node 172 comprises a distributed AWG (DAWG).

Figure 12:
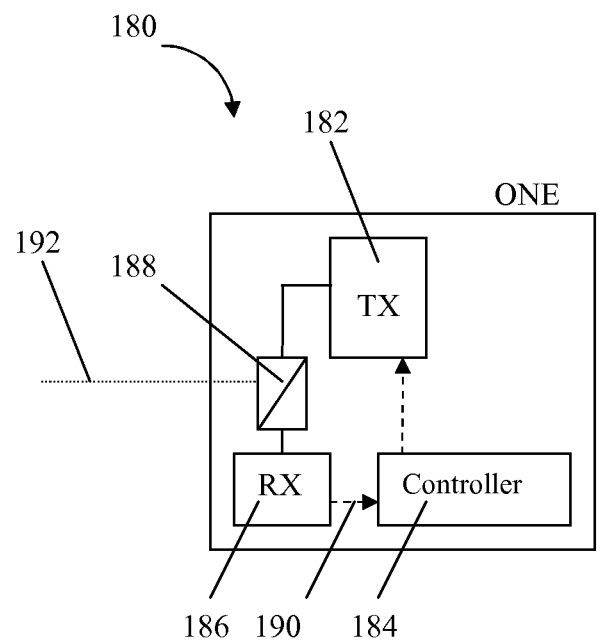
FIG. 12 is a schematic representation of a first optical network element according to a tenth embodiment of the invention.

A tenth embodiment of the invention provides a first optical network element (ONE) 180 as shown in FIG. 12. The ONE 180 comprises an optical transmitter 182, a controller 184 and optical receiver apparatus 186.

The optical transmitter 182 is arranged to generate and transmit a first optical signal. The optical receiver apparatus 186 is arranged to receive a second optical signal. The ONE 180 further comprises a band-split filter 188 arranged to route the first optical signal from the optical transmitter 182 into an optical link 192 and to route the second optical signal received from the optical link to the optical receiver apparatus 186. It will be appreciated that the optical link 192 does not form part of the ONE 180.

The controller 184 is arranged to control the optical transmitter 182 to iteratively generate and transmit the first optical signal at different ones of a plurality of wavelengths until the second optical signal is received.

The controller 184 is arranged to then control the optical transmitter to cease transmission of the first optical signal for a time period. The controller 184 is further arranged to then control the optical transmitter 182 to recommence transmission of the first optical signal at the said wavelength which was being transmitted when the second optical signal was received.

In this embodiment the optical receiver apparatus 186 comprises LOS alarm apparatus arranged to transmit a LOS alarm signal to the controller 184. The LOS alarm signal has a LOS alarm ON state indicative that the second optical signal is not received and has a LOS alarm OFF state indicative that the second optical signal is received.

Figure 13:
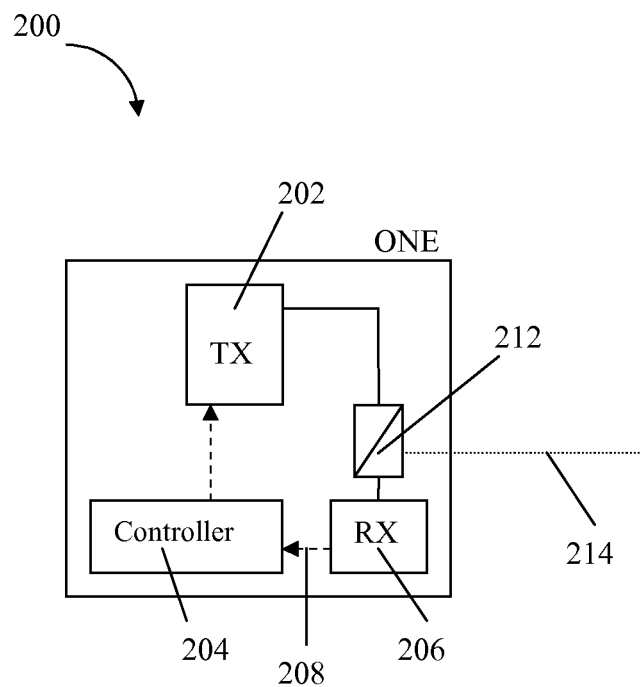
FIG. 13 is a schematic representation of a second optical network element according to an eleventh embodiment of the invention.

FIG. 13 shows a second optical network element 200 according to an eleventh embodiment of the invention. The second ONE 200 comprises an optical transmitter 202, a controller 204 and optical receiver apparatus 206.

The optical transmitter 202 is arranged to generate and transmit a second optical signal. The optical receiver apparatus 206 is arranged to receive a first optical signal. The ONE 200 additionally comprises a band-split filter 212 arranged to route the second optical signal from the optical transmitter 202 into an optical link 214 and arranged to route a first optical signal received from the optical link to the optical receiver apparatus 206. It will be appreciated that the optical link 214 is shown for illustrative purposes only and does not form part of the second ONE 200.

The controller 204 is arranged to wait until the first optical signal is received and to then control the optical transmitter 202 to iteratively generate and transmit the second 10 optical signal at different ones of a plurality of wavelengths until the first optical signal is no longer received. The controller 204 is further arranged to then control the optical transmitter to maintain generation and transmission of the second optical signal at the said wavelength which was being transmitted when the first optical signal was no longer received.

In this embodiment, the optical receiver apparatus 206 comprises a LOS alarm apparatus arranged to transmit a LOS alarm signal 208 to the controller 204. The LOS alarm signal has a LOS alarm ON state indicative that the first optical signal is not received and has a LOS alarm OFF state indicative that the first optical signal is received.

A twelfth embodiment of the invention provides a data carrier having computer 20 readable instructions embodied therein. The computer readable instructions are for providing access to resources available on a processor and the computer readable instructions comprise instructions to cause the processor to perform the steps of one of the above described methods of configuring transmission wavelengths in a PON.

The invention claimed is:

1. A method of configuring transmission wavelengths in a passive optical network comprising a wavelength selective routing element between first and second locations, the method comprising:
at the first location:
   a. selecting a correct wavelength for transmitting a first optical signal from the first location to the second location by iteratively generating and transmitting the first optical signal at different ones of a plurality of wavelengths until a second optical signal is received at the first location; and then
   b. ceasing transmission of the first optical signal for a first time period and then recommencing transmission of the first optical signal at the said selected correct wavelength being transmitted when the second optical signal was received;
and at the second location, remote from the first location:
   c. waiting until the first optical signal is received at the second location;
   d. selecting a correct wavelength for transmitting a second optical signal from the second location to the first location by iteratively generating and transmitting the second optical signal at different ones of a plurality, N, of wavelengths until the first optical signal is no longer received at the second; and
   e. maintaining generation and transmission of the second optical signal at the said selected correct wavelength being transmitted when the first optical signal was no longer received.

2. A method as claimed in claim 1, wherein in a. the first optical signal is transmitted at each said wavelength for a time period, T1, and wherein T1 is greater than a total time period required to select the correct wavelength for transmitting the second optical signal from the second location to the first location by iteratively generating and transmitting the second optical signal at the different ones of the plurality, N, of wavelengths until the first optical signal is no longer received at the second location.

3. A method as claimed in claim 1, wherein in a. the first optical signal is iteratively generated and transmitted until a first alarm signal having a first alarm state is received at the first location, indicating that the second optical signal is received, c. comprises waiting until a second alarm signal having a first alarm state is received at the second location, indicating that the first optical signal is received, and in d. the second optical signal is iteratively generated and transmitted until the second alarm signal having a second alarm state is received at the second location, indicating that the first optical signal is no longer received.

4. A method as claimed in claim 3, wherein each of the first and second alarm signals is a loss of signal alarm signal, and wherein the first alarm state is a loss of signal alarm OFF state and the second alarm state is a loss of signal alarm ON state.

5. A passive optical network comprising:
a first optical network element provided at a first location, the first optical network element comprising a first optical transmitter arranged to generate and transmit a first optical signal, a first controller and first optical receiver apparatus arranged to receive a second optical signal,
wherein the first controller is arranged to:
   a. control the first optical transmitter to select a correct wavelength for transmitting a first optical signal from the first location to the second location by iteratively generating and transmitting the first optical signal at different ones of a plurality of wavelengths until the second optical signal is received; and then
   b. control the first optical transmitter to cease transmission of the first optical signal for a first time period and then recommence transmission of the first optical at the said selected correct wavelength being transmitted when the second optical signal was received;
a second optical network element provided at a second location, remote from the first location, the second optical network element comprising a second optical transmitter arranged to generate and transmit the second optical signal, a second controller and second optical receiver apparatus arranged to receive the first optical signal,
wherein the second controller is arranged to:
   c. wait until the first optical signal is received;
   d. then control the second optical transmitter to select a correct wavelength for transmitting the second optical signal from the second location to the first location by iteratively generating and transmitting the second optical signal at different ones of a plurality, N, of wavelengths until the first optical signal is no longer received; and then
   e. control the second optical transmitter to maintain generation and transmission of the second optical signal at the said selected correct wavelength being transmitted when the first optical signal was no longer received;
and
a remote node provided at a third location, between the first and second locations, the remote node comprising a wavelength selective routing element.

6. A passive optical network as claimed in claim 5, wherein the first controller is arranged to control the first optical transmitter to generate and transmit the first optical signal at each said wavelength for a time period, T1, wherein T1 is greater than a total time period required to select the correct wavelength for transmitting the second optical signal from the second location to the first location by iteratively generating and transmitting the second optical signal at the different ones of the plurality, N, of wavelengths until the first optical signal is no longer received at the second location.

7. A passive optical network as claimed in claim 5, wherein the first optical receiver apparatus comprises a first alarm apparatus arranged to transmit a first alarm signal to the first controller indicative that the second optical signal is received, and the second optical receiver apparatus comprises a second alarm apparatus arranged to transmit a second alarm signal to the second controller, the second alarm signal having a first alarm state indicative that the first optical signal is not received and having a second alarm state indicative that the first optical signal is received.

8. A passive optical network as claimed in claim 7, wherein each of the first and second alarm apparatus is a loss of signal alarm apparatus, and wherein each alarm signal has a loss of signal alarm ON state indicative that the respective optical signal is not received and each alarm signal has a loss of signal alarm OFF state indicative that the respective optical signal is received.

9. A passive optical network as claimed in claim 5, wherein the first optical network element is an optical network termination and the second optical network element is an optical line termination.

10. A non-transitory data carrier having computer readable instructions embodied therein, the computer readable instructions comprising instructions that, when executed by a processor, cause the processor to perform a method of configuring transmission wavelengths in a passive optical network comprising a wavelength selective routing element between first and second locations, the method comprising:

at the first location:
   a. selecting a correct wavelength for transmitting a first optical signal from the first location to the second location by iteratively generating and transmitting the first optical signal at different ones of a plurality of wavelengths until a second optical signal is received at the first location; and then
   b. ceasing transmission of the first optical signal for a first time period and then recommencing transmission of the first optical signal at the said selected correct wavelength being transmitted when the second optical signal was received;

and at second location, remote from the first location:
   c. waiting until the first optical signal is received at the second location;
   d. selecting a correct wavelength for transmitting the second optical signal from the second location to the first location by iteratively generating and transmitting the second optical signal at different ones of a plurality, N, of wavelengths until the first optical signal is no longer received at the second location; and
   e. maintaining generation and transmission of the second optical signal at the said selected correct wavelength being transmitted when the first optical signal was no longer received.

* * * * *